United States Patent [19]

Hyde

[11] Patent Number: 4,897,592
[45] Date of Patent: Jan. 30, 1990

[54] ELECTROSTATIC ENERGY FIELD POWER GENERATING SYSTEM

[76] Inventor: William W. Hyde, 1685 Whitney, Idaho Falls, Id. 83402

[21] Appl. No.: 211,704

[22] Filed: Jun. 27, 1988

[51] Int. Cl.$^4$ .............................................. H02N 1/08
[52] U.S. Cl. ..................................... 322/2 A; 310/309
[58] Field of Search ........................ 322/2 A; 310/309

[56] References Cited

U.S. PATENT DOCUMENTS

| | | | |
|---|---|---|---|
| 2,522,106 | 9/1950 | Felici | 310/309 |
| 3,013,201 | 12/1961 | Goldie | 322/2 A |
| 4,127,804 | 11/1973 | Breaux | 322/2 A |
| 4,151,409 | 4/1979 | O'Hare | 250/212 |
| 4,595,852 | 6/1986 | Gundlach | 310/309 |
| 4,622,510 | 11/1986 | Cap | 322/2 A X |

Primary Examiner—R. J. Hickey
Attorney, Agent, or Firm—Fleit, Jacobson, Cohn, Price, Holman & Stern

[57] ABSTRACT

Externally charged electrodes of an electrostatic generator induce charges of opposite polarity on segments of a pair of confronting stators by means of electric fields within which a pair of rotors are confined during rotation to vary the charge binding field linkages between confronting rotors and stators by a shielding action of the rotors in a plane perpendicular to the field flux. A high electric potential difference induced between the stators resulting from such rotation of the rotors, is transformed by an output circuit into a reduced DC voltage applied to a load with a correspondingly increase current conducted therethrough.

19 Claims, 3 Drawing Sheets

ELECTROSTATIC ENERGY FIELD POWER GENERATING SYSTEM

BACKGROUND OF THE INVENTION

This invention relates to the generation of electrical power by conversion of energy from an electrostatic field.

The conversion of energy from a static electric field into useful electrical energy by means of an electrostatic generator is already well known in the art as exemplified by the disclosures in U.S. Pat. Nos. 2,522,106, 3,013,201, 4,127,804, 4,151,409 and 4,595,852. Generally, the energy conversion process associated with such prior art electrostatic generators involves the input of mechanical energy to separate charges so that a considerable portion of the output is derived from the conversion of mechanical energy.

It is therefore an important object of the present invention to provide an electrostatic generator in which electrical power is derived from the energy of static electric fields with a minimized input of mechanical power.

SUMMARY OF THE INVENTION

In accordance with the present invention, static electric fields are established between electrodes externally maintained at charge levels of opposite polarity and a pair of internal stator discs having segmental surfaces that are dielectrically spaced to confine thereon charges induced by the electric fields. A pair of rotor discs are rotated within continuous electric fields in planes perpendicular to the field flux to locationally vary the charge linkage established by the electric fields between the electrodes and stator discs. Such changes in charge linkage are effected by rotation of electrically conductive segments of the rotor angularly spaced from each other to partially shield the stator discs from the electric fields. The segments of each rotor disc have charged faces confronting the electrodes in its field to shield the stator disc over a total face area that is one-half the total area of the confronting segment surfaces on the stator disc to which the induced charges are confined. Charges on the rotors and stators are equalized by electrical interconnections established through the rotor shafts. The stator discs are electrically interconnected with an electrical load through an output circuit transforming a high potential between the stator discs into a reduced dc voltage to conduct a correspondingly multiplied current through the load.

BRIEF DESCRIPTION OF DRAWING FIGURES

These and other objects and features of the present invention will become apparent from the following description taken in conjunction with the preferred embodiments thereof with reference to the accompanying drawings in which like parts or elements are denoted by like reference numerals throughout the several views of the drawings and wherein.

Figure 2:
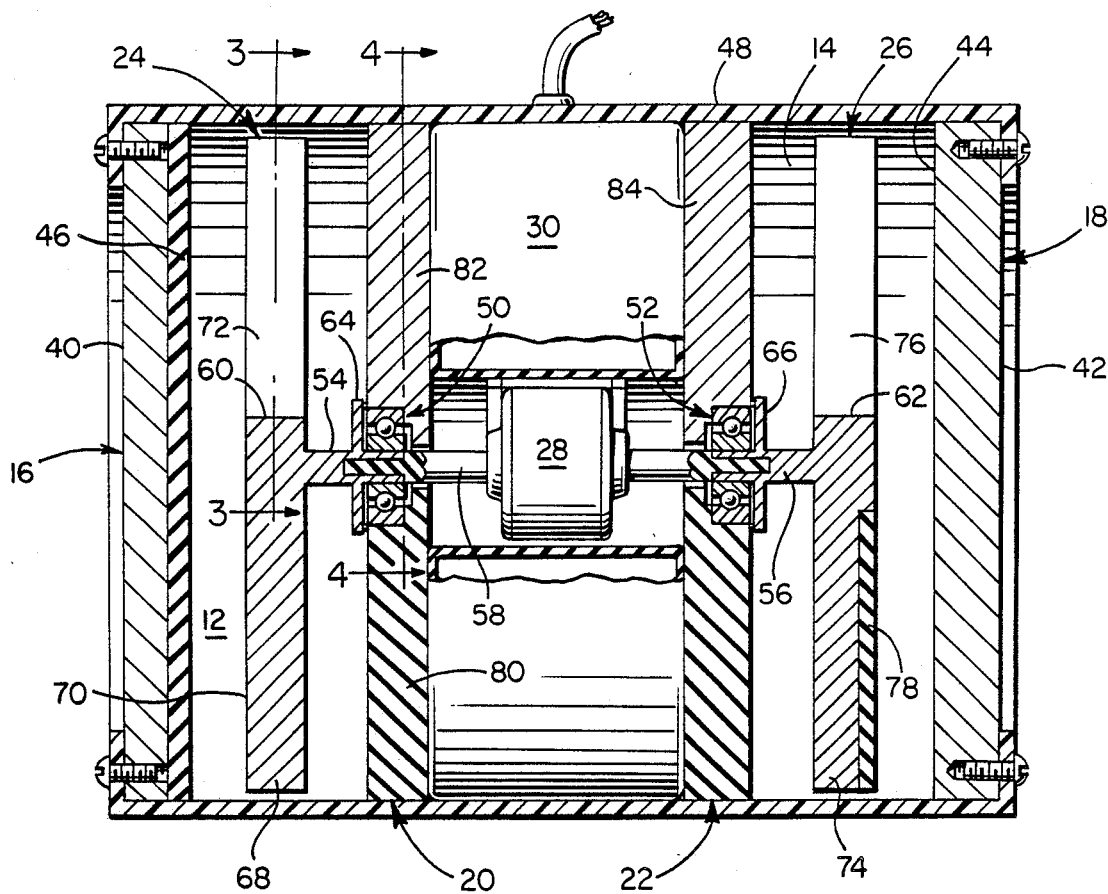
FIG. 2 is a side section view of an electrostatic generator embodying the system of FIG. 1 in accordance with one embodiment of the invention.
Figure 3:
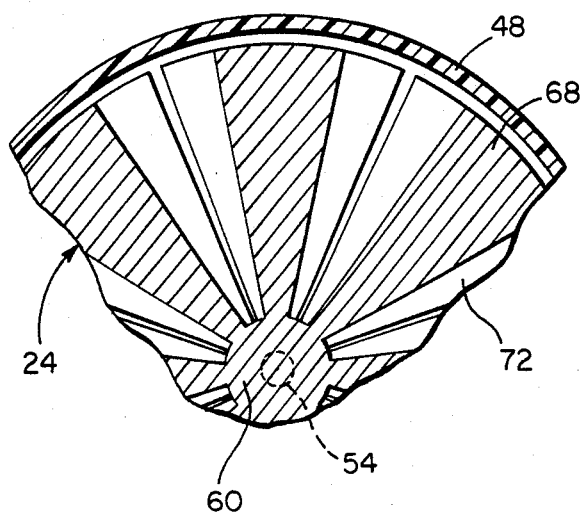
Figure 4:
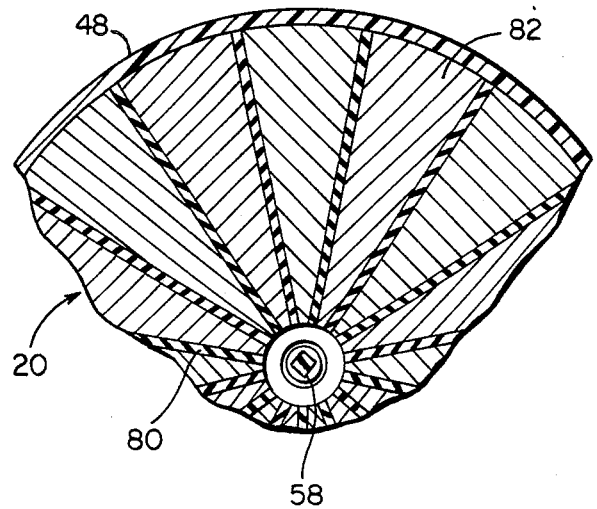

FIGS. 3 and 4 are partial section views taken substantially through planes indicated by section lines 3—3 and 4—4 in FIG. 2.

Figure 5A:
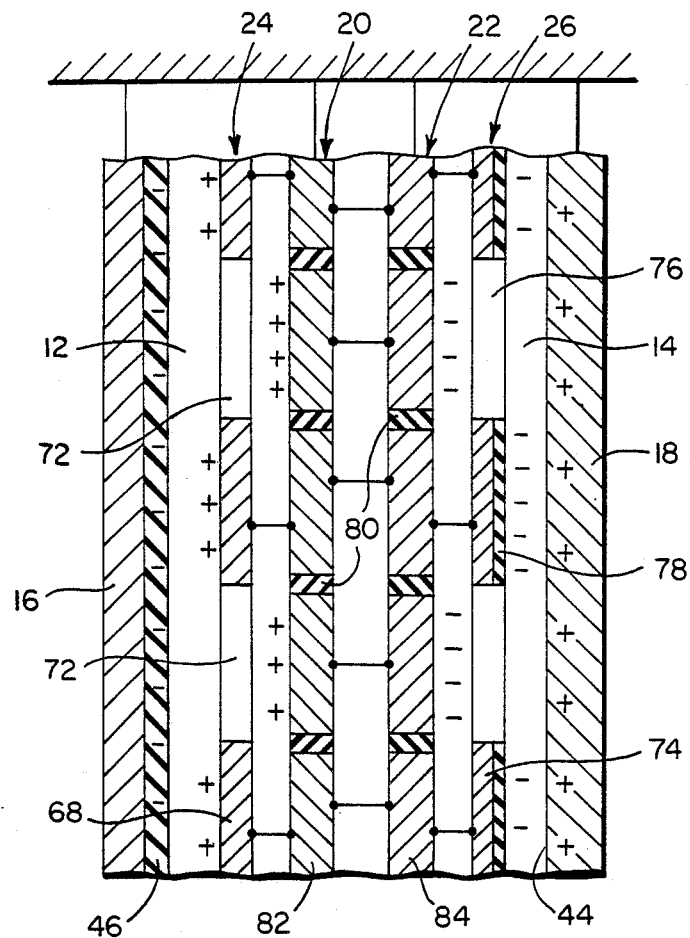
Figure 5B:
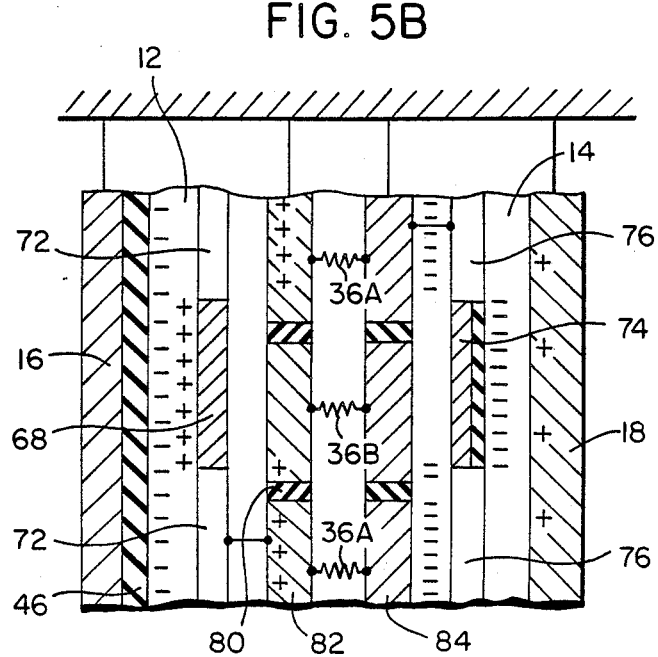

FIGS. 5A and 5B are schematic partial laid out top views of the electrostatic generator of FIGS. 2-4, under static and dynamic charge distribution condictions, respectively.

Figure 6:
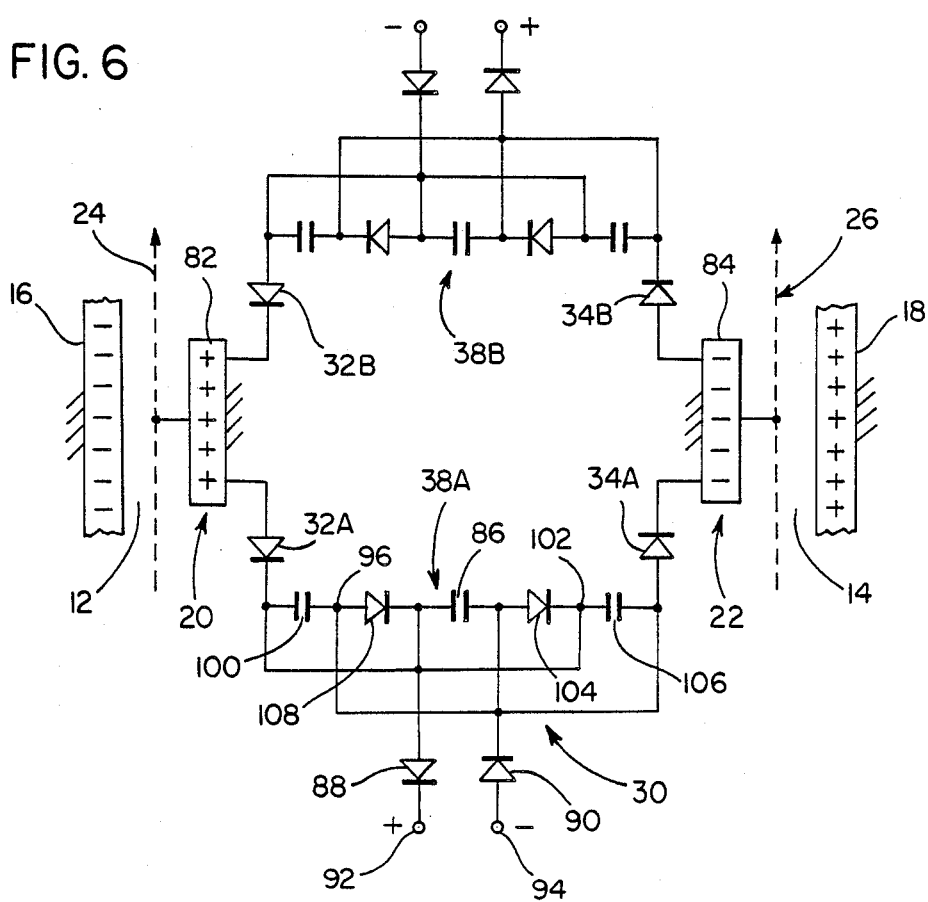

FIG. 6 is an electrical circuit diagram of the output circuit of the generator shown in FIG. 2, in accordance with one embodiment.

DETAILED DESCRIPTION OF PREFERRED EMBODIMENT

Figure 1:
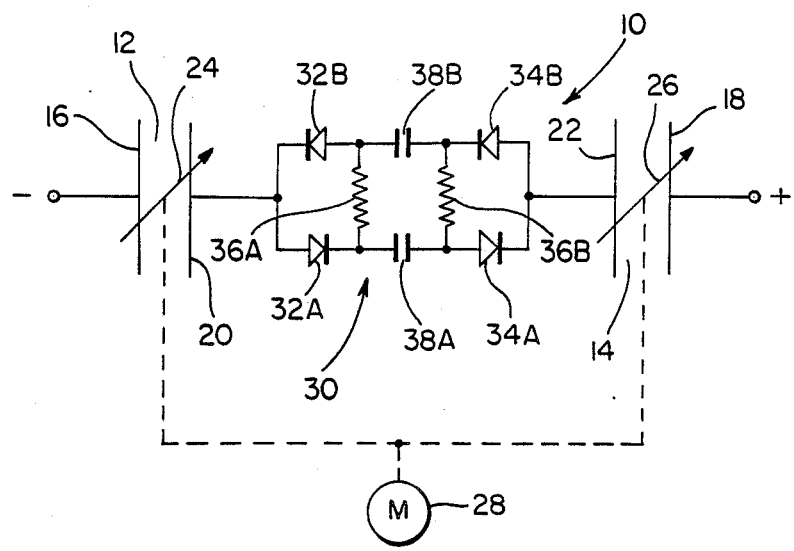
FIG. 1 is a simplified electrical circuit diagram corresponding to the energy conversion system of the present invention.

Referring now to the drawings in detail, FIG. 1 diagrammatically depicts the energy conversion system of the present invention generally referred to by reference numeral 10. As diagrammed in FIG. 1, the system includes a pair of electrostatic fields 12 and 14 established by electrostatic charges of opposite polarity applied to electrode plates 16 and 18 from some external energy source. Thus, the electrostatic field 12 is established between electrode 16 and a stator disc 20 while the electrostatic field 14 is established between electrode 18 and a stator disc 22. In accordance with the present invention, electrostatic charge linkages established by the flux of the fields between the electrodes and stators are periodically varied by displacement within continuous energy fields 12 and 14 in response to rotation of rotors 24 and 26 aligned with planes perpendicular to their common rotational axis and the field flux as will be hereinafter described. The rotors are mechanically interconnected with an electric motor 28, as diagrammatically illustrated in FIG. 1, for rotation about the common rotational axis. Electrical energy may be extracted from the electric fields 12 and 14 during rotation of the rotors 24 and 26 by motor 28 through an output circuit generally referred to by reference numeral 30. The output circuit 30 as shown, in FIG. 1 in a simplified fashion, includes two pair of current conducting diodes 32A, 32B and 34A, 34B. The diodes of each pair are oppositely poled and each pair is connected in parallel to one of the stators 20 and 22. The diodes of each pair are also electrically connected across an electrical load represented by resistors 36A and 36B with capacitor networks 38A and 38B interconnected between each pair of diodes by means of which the voltage potential between the stators 20 and 22 is reduced in favor of an increased current through the electrical load.

Referring now to FIGS. 2, 3 and 4 in particular, a physical embodiment of the energy conversion system diagrammed in FIG. 1 is shown. The electrodes 16 and 18 are in the form of circular plates or discs made of an electrically conductive metal having external surfaces 40 and 42 adapted to be charged from the external source as aforementioned. The internal surface 44 of electrode 18 is thereby adapted to maintain a positive charge opposite in polarity to the negative charge of the electrode 16 which is maintained in a stable ion form within a dielectric surface portion 46 of the electrode 16. The energy conversion system may be enclosed within an outer housing 48 to which the electrodes 16 and 18 are secured.

With continued reference to FIG. 2, the stators 20 and 22 mounted by housing 48 in axially fixed spaced relation to the electrodes 16 and 18 are provided with bearings 50 and 52 establishing the aforementioned common rotational rotor axis journaling a powered shaft assembly having electrically conductive shaft sections 54 and 56 to which the rotors 24 and 26 are respectively connected. In the embodiment illustrated in FIG. 2, the drive motor 28 is mechanically interconnected with the shaft sections 54 and 56 through an electrically nonconductive shaft section 58 of the power shaft assembly for simultaneous rotation of both rotors 24 and 26 at the same speed and in the same direction about the common rotational axis perpendicular to parallel spaced planes with which the electrode and stator discs are aligned. The electrically conductive shaft sections 54 and 56 are respectively keyed or secured in any suitable fashion to hub portions 60 and 62 of the rotors and are provided with flange portions 64 and 66 forming electrical wipers in contact with confronting surfaces of the stators 20 and 22, which are inductively charged by the static electric fields 12 and 14 to equal levels of opposite polarity.

As more clearly seen in FIGS. 2 and 3, the rotor 24 has a plurality of angularly spaced, field linkage controlling segments 68 projecting radially outwardly from the hub portion 60. Each rotor segment 68 is made of an electrically conductive metal having a face 70 on one axial side confronting the adjacent electrode 16. The faces 70 confronting the electrode 16 are charged positively by the electric field 12 extending between the dielectric surface portion 46 of electrode 16 and the stator disc 20. While the electric field 12 projects through the spaces 72 between the rotor segments 68, the rotor segments 68 themselves shield portions of the stator disc 20 from the electric field.

The rotor 26 is similarly formed with rotor segments 74 angularly spaced from each other by spaces 76 through which the electric field 14 extends between the positively charged surface 44 of electrode 18 and the stator 22. The rotor segments 74 of rotor 26 as shown in FIG. 2, are provided with dielectric surface portions 78 confronting the internally charged surface 44 of electrode 18. While the rotor segments 74 are negatively charged by the electric field 14 within the surface portions 78, they also shield portions of the stator disc 22 from the electric field as in the case of the rotor segments 68 hereinbefore described. The internal dielectric surface portion 46 of electrode 16 and dielectric surface portions 78 of rotor 26 act as a stabilizer to prevent eddy currents and leakage of negative charge. Further, in view of the electrical connections established between the rotors and the stator discs, the charge on each stator is equalized with that of the charge on its associated rotor.

As shown in FIGS. 2 and 4, the stator disc 20 includes a plurality of segments 82 to which charges are confined, closely spaced from each other by dielectric spacers 80. The segments 82 are electrically interconnected with the rotor segments 68 through rotor shaft section 54. Similarly, the segments 84 of the stator 22 are electrically interconnected with the rotor segments 74 through rotor shaft section 56. The stator segments 82 and 84 are therefore also made of electrically conductive metal. Each of the segments 82 of stator 20 is electrically interconnected through the output circuit 30 with each of the segments 84 of the stator. The stator discs being fixedly mounted within the housing 48, centrally mount the bearings 50 and 52 through which the electrically nonconductive motor shaft section 58 is journaled as shown in the embodiment of the invention illustrated in FIG. 2. Further, the total area of the charged segment surfaces on each of the stator discs is greater than the total area of the faces 70 or 78 on the segments of each associated rotor disc 24 or 26. According to one embodiment, the total charged stator surface area is twice that of the rotor face area.

According to the embodiment of the invention illustrated in FIG. 6, the output circuit 30 includes the two oppositely poled capacitive circuit networks 38A and 38B connected across each aligned pair of stator segments 82 and 84 on the stators 20 and 22 by means of the oppositely poled diodes 32A and 34A. Each of such capacitive circuit networks includes a capacitor 86, the opposite sides of which are connected by oppositely poled diodes 88 and 90 to positive and negative load terminals 92 and 94 across which a suitable electrical voltage is established for operating an electrical load. The diode 88 is connected to the junction 102 between diode 104 and one side of capacitor 106. The diode 88 is also connected to the junction between one side of capacitor 100 and the diode 32A. The diode 90, on the other hand, is interconnected with the junction 96 between diode 108 and capacitor 100. Also, diode 90 is connected to the junction between the other side of capacitor 106 and the diode 34A. The foregoing circuit arrangement of capacitive network 38A is the same as that of network 38B by means of which aligned pairs of the stator segments 82 and 84 have the electrical potentials therebetween transformed into a lower voltage across the load terminals 92 and 94 to conduct a higher load current.

FIG. 5A illustrates the distribution of charges established in the electric fields 12 and 14 between the electrodes and stators under static conditions in which each of the rotor segments 68 and 74 is positioned in alignment with one of the stator segments 82 and 84 to thereby shield alternate stator segments from the electric fields. The charges established by the electric fields are therefore confined to the faces of alternate stator segments confronting the electrodes and are equalized with the charges established on and confined to the shielding faces of the rotor segments confronting the electrodes by virtue of the electrical interconnection between the rotors and stators as aforementioned. As depicted in FIG. 5B, when rotation is imparted to the rotors, the charge linkages established by the electric fields between the electrodes and alternate stator segments 82 or 84 are interrupted by the moving rotor segments 68 or 74 so that previously sielded stator segments become exposed to the fields to reestablish field energy linkages with the associated electrodes. Such action causes electrical potentials to be established between the stator segments 82 and 84.

It will be apparent from the foregoing description that the electrostatic energy fields 12 and 14 of opposite polarity are established maintained between the externally charged electrodes 16 and 18 and the internally charged stators 20 and 22 under static conditions as depicted in FIG. 5A. During rotation, the rotors 24 and 26 continuously disposed within such energy fields 12 and 14, exert forces in directions perpendicular to the field flux representing the energy linkages between electrodes and stators to cause interruptions and reestablishment of energy linkages with portions of different stator segments as depicted in FIG. 5B. Such energy linkage locational changes and the charge binding and unbinding actions between electrodes and stators creates an electrical potential and current to flow between stators through the output circuit 30. Thus, the output circuit when loaded extracts energy from the electric fields 12 and 14 as a result of the field linkage charge bindinbg and unbinding actions induced by rotation of the rotors. The stator segments 82 and 84 shielded from the electric fields by the moving rotor segments 68 and 74 as depicted in FIG. 5B, have electric potentials of polarity opposite to those of the external electrodes 16 and 18 because of the field linkage charge unbinding action. Previously shielded stator segments being exposed to the electric fields by the moving rotor segments, have the same electric potential polarity as those of the external electrodes because of field linkage binding action. Since the forces exerted on the respective rotors by the electric fields 12 and 14 of opposite polarity act on the common rotor shaft assembly perpendicular to said fields, such forces cancel each other. The energy input to the system may therefore be substantially limited to mechanical bearing losses and windage during conversion of electrostatic field energy to electrical energy as well as electrical resistance losses and other electrical losses encountered in the output circuit 30.

Based upon the foregoing operational characteristics, rotation of the rotors in accordance with the present invention does not perform any substantial work against the external electric fields 12 and 14 since there is no net change in capacitance thereby enabling the system to convert energy with a reduced input of mechanical energy and high efficiency, as evidenced by minimal loss of charge on the electrodes. It was therefore found that working embodiments of the present invention require less than ten percent of the electrical output energy for the mechanical input. Further, according to one prototype model of the invention, a relatively high output voltage of 300,000 volts was obtained across the stators. By reason of such high voltage, an output circuit 30 having a voltage reducing and current multiplying attribute as hereinbefore described was selected so as to render the system suitable for many practical applications.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An energy conversion system including a pair of electrodes maintained electrostatically charged at substantially equal potentials of opposite polarity, stator means mounted in operatively spaced relation to said electrodes for inducement therein of charges of opposite polarity through electric fields established by said equal potentials, power driven rotor means continuously disposed within said electric fields for receiving charged induced by said electric fields, means electrically connecting said rotor means to the stator means for equalizing of said induced charges therebetween, field linkage control means for movably shielding the stator means from the electric fields during rotation of the rotor means and output circuit means operatively connected to the stator means for extracting therefrom an operating voltage in response to movement of said shielding of the stator means.

2. The system as defined in claim 1 wherein said stator means includes a pair of axially spaced stator discs respectively linked electrostatically to the electrodes by said eletric fields, the rotor means including a pair of rotor discs respectively disposed axially between the electrodes and the stator discs.

3. The system as defined in claim 2 wherein said field linkage control means comprises angularly spaced segments on the rotor discs having charged faces shielding portions of the stator discs from the electrodes.

4. The system as defined in claim 3 wherein each of the stator discs includes angularly spaced surface portions confronting the angularly spaced rotor segments and dielectric means between said surface portions for confining the induced charges thereto, the surface portions of the stator discs and the charged faces of the rotor segments being unequal in area.

5. An energy conversion system including a pair of electrodes electrostatically charged to substantially equal potentials of opposite polarity, stator means mounted in operatively spaced relation to said electrodes for inducement therein of charges of opposite polarity through electric fields established by said equal potentials, said stator means including a pair of axially spaced stator discs respectively linked to the electrodes by said electric fields, power driven rotor means continuously disposed within said electric fields for receiving induced charges thereon, means electrically connecting said rotor means to the stator means for transfer of said induced charges therebetween, said rotor means including a pair of rotor discs respectively disposed axially between the electrodes and the stator discs and field linkage control means for variably shielding the stator means from the electric fields during rotation of the rotor means, said field linkage control means comprising angularly spaced segments on the rotor discs having charged faces shielding portions of the stator discs from the electrodes, each of the stator discs including angularly spaced surface portions confronting the angularly spaced rotor segments and dielectric means between said surface portions for confining the induced charges thereto, the surface portions of the stator disc having areas twice that of the areas of the charged faces of the rotor segments and output circuit means operatively connected to the stator means for establishing an operating voltage in response to said variation in the shielding of the stator means by the rotor means.

6. The system as defined in claim 5 including a power shaft assembly on which the rotors are mounted for simultaneous rotation, said electrical connecting means being formed by electrically conductive sections of said shaft assembly.

7. The system as defined in claim 6 wherein the charged faces of the rotor segments on one of the rotors is formed by dielectric material within which the induced charges of negative polarity are confined in stable ion form.

8. The system as defined in claim 7 wherein said output circuit means includes a pair of dc voltage terminals, a capacitive network, and current blocking diode means coupling the network to the terminals and to each of the surface portions of the stator discs for multiplying current conducted between the stator discs while reducing potentials therebetween to a value equal to the operating voltage across the dc voltage terminals.

9. The system as defined in claim 2 wherein each of the stator discs includes angularly spaced surface portions confronting the rotor and dielectric means between said surface portions for confining the induced charges thereto.

10. The system as defined in claim 9 wherein said output circuit means includes a pair of dc voltage terminals, a capacitive network, and current blocking diode means coupling the network to the terminals and to each of the surface portions of the stator discs for multiplying current conducted between the stator discs while reducing potentials therebetween to the operating voltage across the terminals.

11. The system as defined in claim 1 including a power shaft assembly on which the rotors are mounted for simultaneous rotation, said electrical connecting means being formed by electrically conductive sections of said shaft assembly.

12. The system as defined in claim 3 wherein the charged faces of the rotor segments on one of the rotors is formed by dielectric material within which the induced charges of negative polarity are confined in stable ion form.

13. The system as defined in claim 1 wherein said stator means and said rotor means respectively have faces confronting each of the electrodes, and dielectric surface means coating those of the confronting faces on which the charges of negative polarity are induced and maintained in a stable ion form for preventing eddy currents and charge leakage.

14. The system as defined in claim 1 wherein the stator means and the rotor means have faces continuously exposed to said electric fields on which the charges of negative polarity are induced, and stabilizer means for preventing leakage of the induced charges through said faces.

15. The system as defined in claim 14 wherein said stabilizer means comprises dielectric material on said faces maintaining the negative charges therein in stable ion form.

16. In an energy conversion system having an electrode of one polarity maintained at an electrostatic potential, a stator and a rotor disposed within an electric field established between the electrode and the stator by said potential on the electrode, means mounting the rotor for rotation continuously within the electric field and means electrically interconnecting the rotor and the stator for equalizing electrostatic charges established thereon opposite in polarity to said one polarity, the rotor having charged surface means partially shielding the stator from the electric field for producing an electric potential on the stator in response to rotation of the rotor causing movement of the charges established by the unshielded electric field.

17. The system as defined in claim 16 wherein the stator includes means for confining electrostatic charges established to surfaces of greater total area than that of the charged surface means of the rotor.

18. The system as defined in claim 1 wherein said stator means is mounted in fixed parallel spaced relation to the electrodes and said rotor means is rotatable about a rotational axis perpendicular to said electrodes.

19. In an electrostatic generator having a pair of axially spaced electrodes with electric fields therebetween establishing corresponding capacitances, a power driven rotor and means for electrically interconnecting the rotor with one of the electrodes of said pair during rotation of the rotor, the improvement residing in means fixedly mounting both of the electrodes of said pair, said electric fields being established and maintained by means respectively applying charge producing potentials of substantially equal and opposite polarity to the other of the electrodes of said pair for cancellation of forces exerted by said electric fields on the rotor, means mounted by the rotor for partial shielding of said one of the electrodes from said electric fields and means responsive to rotation of the rotor for extracting an output voltage generated on said one of the electrodes by movement of said partial shielding thereof during maintenance of the corresponding capacitances established by the electric fields.

* * * * *